(No Model.)
A. S. BAKER.
Broadcast Seeder.
No. 239,420.   Patented March 29, 1881.
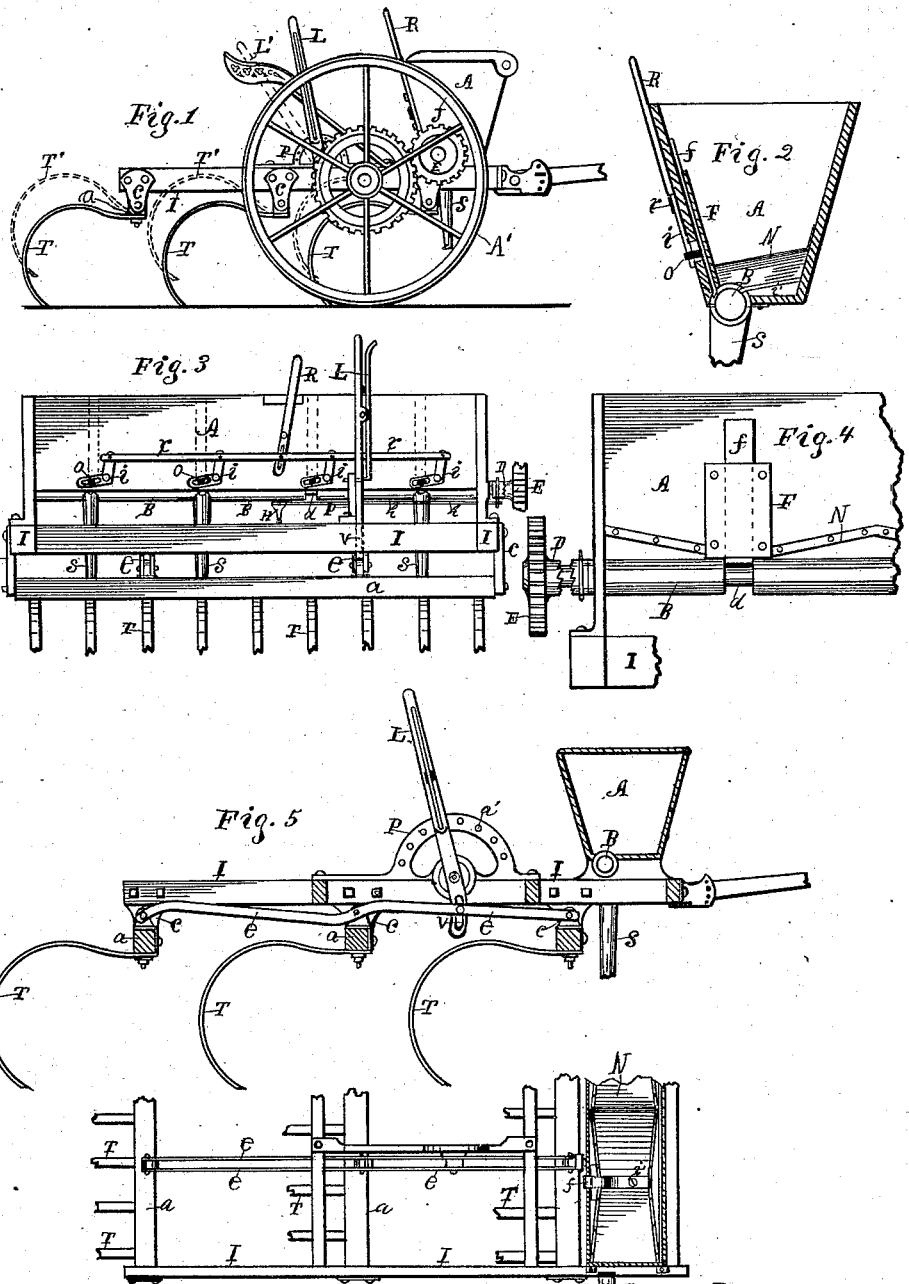

UNITED STATES PATENT OFFICE.

ABNER S. BAKER, OF KALAMAZOO, MICHIGAN, ASSIGNOR OF ONE-HALF TO NICHOLAS BAUMANN, OF SAME PLACE.

BROADCAST-SEEDER.

SPECIFICATION forming part of Letters Patent No. 239,420, dated March 29, 1881.

Application filed November 13, 1880. (No model.)

*To all whom it may concern:*

Be it known that I, ABNER S. BAKER, of Kalamazoo, Michigan, have invented new and useful Improvements in Broadcast-Seeders, of which the following is a specification.

My invention has for its object the construction of a feeding device proof against crushing the grain, and especially adapted for sowing grass and clover seed as well as large grain.

Its construction, embodying the improvements, consists in castings secured to the two opposite sides of the axle-frame, to which frame transporting-wheels are connected. In these castings the revoluble tooth-beams have their bearings, which obviates the necessity of a tooth-frame beneath.

Its construction further consists in providing the mechanism which operates the tooth-beams with a cam-eccentric lever so arranged that the teeth and lever approach each other when raising said teeth, thus acquiring greater leverage with a small degree of power.

Its construction also consists in a feed-shaft having plain recesses or mortises grooved in the same, for receiving and discharging the grain by transporting it out over its revolving surface, and having gates and tongues of a given arrangement and construction, for controlling the amount of seed sown and for adapting it to sow different kinds of seed.

In the accompanying drawings, forming a part of this specification, Figure 1 is a side elevation of the device, showing a side of the frame with its tooth-bar castings or bearings; Fig. 2, a cross-section of seed-box; Fig. 3, rear view of machine, showing the lever and mechanism for operating the feed-gates; Fig. 4, broken section of a horizontal inner view of the seed-box, showing feed-recess in shaft and feed-gates; Fig. 5, cross-section of frame and tooth-beams, showing the cam eccentric lever; and Fig. 6, a broken top view, especially illustrating the floor of the seed-box with its gates and tongue.

I I are the side beams of a rectangular axle-frame, having the castings $c\ c$ secured to them, in which castings the tooth-beams $a$ are pivoted in the manner shown in Figs. 1 and 3. To the tooth-beams $a\ a$ is connected rod or bar $e$, operated by lever L, which is slotted in its lower end at $v$, into which is inserted a stud projecting from bar $e$. By this construction of frame a tooth-frame proper is dispensed with, and the leverage specified in raising the teeth T is effected, as shown by dotted lines $T'$ and $L'$ in Fig. 1.

A is a seed-box, having a floor with alternate depressions and elevations, their converging inclines meeting at the orifice over the grain-spouts S. $d$ is the mortise or grain-recess in shaft B, into which the lower end of gate $f$ closely and easily fits, said gate aiding in controlling the amount of grain sown, and entirely stopping the flow of grain when shut down, as seen in Fig. 2. This construction is very simple, and is deemed an improvement over corrugated feeds and those provided with horizontal and crosswise partitions, owing to the fact that the grain is rolled out of the box and is never crushed, and the slide $f$ can be shut when the machine is in motion, when, by the aid of the tongue $i'$, which entirely closes the opposite escape of recess $d$, no grain is scattered where it is not desired. The tongue $i'$ is detachably secured in the floor of the seed-box, and is designed to be made of varying lengths, longer ones being inserted when sowing clover or grass seed, when the pressure of the seed toward the delivery or through the opening is controlled uniformly in all sizes of grain. If desirable, for given kinds of grain the seed-box floor, consisting of tongues $i'$ and inclines N, may be cast all in one piece and be detachably secured in said box.

Gates $f$ are all controlled by lever R, rod $r$, and slotted bell-crank levers or bars $i\ i$. A stud on rod $r$ works loosely in the slot of lever R, and studs $o$, projecting from gates $f$ through the side of the seed-box A, work loosely in slots of the levers $i$. Lever R and levers $i\ i$ are fulcrumed on pivots, securing them to the seed-box, and levers $i\ i$ are connected by pivots with bar $r$. By this arrangement of lever mechanism the lever moves horizontally and all the gates $f$ perpendicularly with a single movement of the lever, with accuracy, freedom, and less friction of parts than has heretofore been effected.

No further description of the operation of the device is deemed necessary.

What I claim and desire to secure is—

The seed-box A, provided with the vertically-adjusting gates, having stud $o$, in combination with lever R, bar $r$, and bell-crank levers $i$, constructed with their cam-connections, for the purpose set forth.

ABNER S. BAKER.

Witnesses:
CHAS. L. SCHILLING,
I. L. WEST.